(12) United States Patent
Cummings et al.

(10) Patent No.: US 8,154,572 B2
(45) Date of Patent: Apr. 10, 2012

(54) ADJUSTING THE CALIBRATION OF AN IMAGING SYSTEM

(75) Inventors: Calvin D. Cummings, Surrey (CA); Ali Faraz, Port Moody (CA)

(73) Assignee: Eastman Kodak Company, Rochester, NY (US)

( * ) Notice: Subject to any disclaimer, the term of this patent is extended or adjusted under 35 U.S.C. 154(b) by 1349 days.

(21) Appl. No.: 11/756,071

(22) Filed: May 31, 2007

(65) Prior Publication Data
US 2008/0299470 A1 Dec. 4, 2008

(51) Int. Cl.
*B41J 2/385* (2006.01)
*B41J 2/435* (2006.01)
*B41J 2/47* (2006.01)

(52) U.S. Cl. ......... 347/116; 347/229; 347/234; 347/248

(58) Field of Classification Search ................... 347/116, 347/224, 225, 227, 229, 234, 235, 248–250
See application file for complete search history.

(56) References Cited

U.S. PATENT DOCUMENTS

| | | | |
|---|---|---|---|
| 4,605,970 A | 8/1986 | Hawkins | |
| 5,274,397 A * | 12/1993 | Grover | 347/139 |
| 5,832,415 A | 11/1998 | Wilkening et al. | |
| 6,937,959 B2 | 8/2005 | Keyl et al. | |
| 7,561,175 B2 * | 7/2009 | Fischer et al. | 347/234 |
| 7,854,199 B2 * | 12/2010 | Cummings et al. | 101/463.1 |
| 2001/0050760 A1 | 12/2001 | Uemura et al. | |
| 2004/0115344 A1 * | 6/2004 | Newsome et al. | 427/162 |
| 2005/0243120 A1 | 11/2005 | Detmers et al. | |

FOREIGN PATENT DOCUMENTS

| | | |
|---|---|---|
| DE | 44 37 284 A1 | 4/1996 |
| DE | 197 32 668 | 10/1999 |
| DE | 199 35 971 A1 | 3/2000 |
| DE | 101 08 624 A1 | 9/2002 |
| DE | 102 59 493 A1 | 8/2003 |
| DE | 103 40 382 A1 | 4/2004 |
| DE | 10 2005 013 656 A1 | 11/2005 |
| GB | 2 069 292 A | 8/1981 |
| JP | 10-267617 | 1/1989 |

* cited by examiner

*Primary Examiner* — Hai C Pham
(74) *Attorney, Agent, or Firm* — Raymond L. Owens; Nelson Adrian Blish (57) ABSTRACT

The calibration of an imaging system is adjusted for geometric distortion of an image formed by a group of imaging channels on a media supported on a media support. The media support includes a plurality of individually spaced reference features disposed on a surface of the media support and a change in an expected position of at least one of the reference features is determined. Activation timing of the channels is adjusted in accordance with such changes. The imaging channels can be supported on a movable carriage and movement of the carriage can be adjusted in accordance with such changes.

12 Claims, 6 Drawing Sheets

ADJUSTING THE CALIBRATION OF AN IMAGING SYSTEM

FIELD OF THE INVENTION

The invention relates to imaging systems for forming images on recording media. More particularly, the invention relates to calibration of such imaging systems.

BACKGROUND OF THE INVENTION

Various imaging systems are used to form images on recording media. For example, computer-to-plate systems (also known as CTP systems) are used to form images on printing plates. A plurality of imaged printing plates is subsequently provided to a printing press where images from the printing plate are transferred to paper or other suitable surfaces. It is important that the plurality of images be accurately aligned with respect to one another to ensure an accurate registration among the images. It is important that each image be geometrically correct and free from distortion to ensure desired quality characteristics of the finished printed article. Geometric characteristics of an image can involve but are not limited to: a desired size of an image portion or a desired alignment of one image portion with another image portion.

The geometric accuracy of the images formed on a recording media is dependant on numerous factors. For example, images are formed on a recording media by mounting the media on a support and directing imaging beams towards the media to form the images thereupon. Scanning the recording media with the imaging beams during a plurality of scans typically forms the images. The positioning accuracy of the imaging beams with respect to the recording media impacts the geometric correctness of the formed images. Deviations in required positioning of the imaging beams during each scan can lead to imaging errors.

In order to reduce imaging errors, imaging systems are typically calibrated. Test images are typically formed on recording media and are analyzed to determine deviations. Deviations associated with a desired geometric characteristic of a test image are typically corrected by performing various adjustments in the imaging systems. The adjustments can be electronic or mechanical in nature. Analysis of the test images is typically performed on specialized and dedicated equipment that can include various image sensors. For example CCD sensors can be used to capture various images of the test images and a controller can be used to analyze the captured images and determine positional information therefrom.

Specialized and dedicated calibration systems are costly and require regular calibration themselves to insure their integrity. Such systems are typically employed at the factory where the imaging systems are manufactured. Factory based calibration systems complicate the calibration of an imaging system in the field. For instance, test images would need to be made in the field and then shipped to another site for analysis. This increases the time required for calibration and increases the chances for imaging errors to occur.

There remains a need for effective and practical methods and systems that permit the calibration of an imaging system to correct geometric distortions of images formed on a recording media by an imaging system.

SUMMARY OF THE INVENTION

In accordance with the present invention, there is provided a method for changing the calibration of an imaging system to adjust for geometric distortion, comprising:

providing a media support for receiving recording media and a plurality of individually spaced reference features disposed on a surface of the media support;

providing a plurality of individually addressable imaging channels moveable relative to the imaging support while directing imaging beams from the addressable channels to form images on the recording media; and determining a change in an expected position of at least one reference feature and adjusting activation timing of a portion of the imaging channels in accordance with such changes.

The addressable imaging channels can be provided on a movable carriage and the method can further adjust a movement of the carriage in accordance with such changes.

The imaging apparatus can be calibrated after operation. Advantageously, various example embodiments of the invention can allow the imaging apparatus to be calibrated at a point of use. The imaging apparatus can be recalibrated. Recalibration can be performed without the need to form additional calibration images. Recalibration can be performed without the need of additional calibration equipment.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Figure 1:
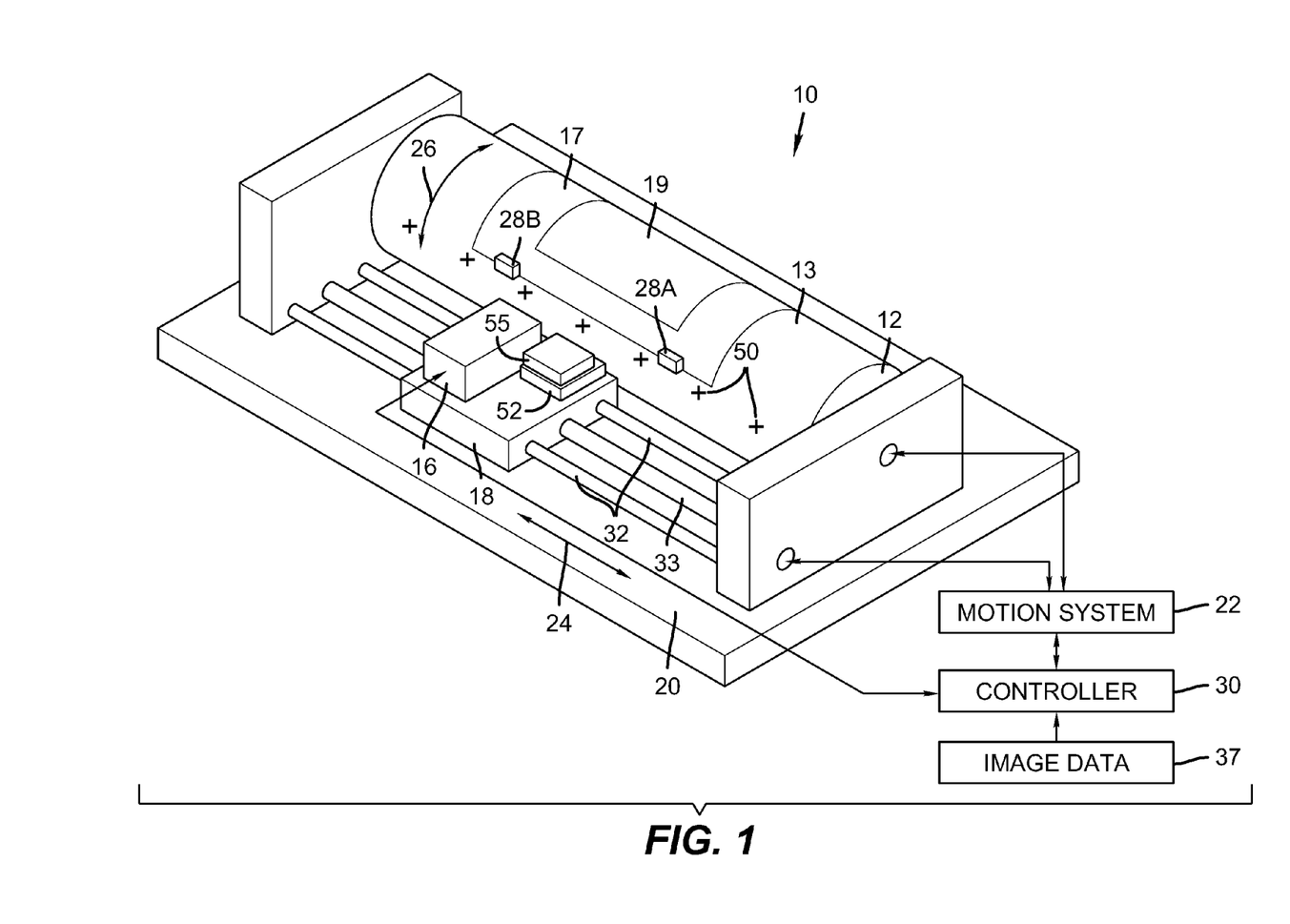
FIG. 1 is a partial schematic view of an imaging apparatus as per an example embodiment of the invention.

FIG. 1 schematically shows an apparatus 10 for forming an image 19A on a recording media 17 as per an example embodiment of the invention. Apparatus 10 includes a media support 12, which in this example includes an external drum configuration. Other examples embodiments of the invention can include other forms of media supports such as internal drum configurations or flat surface configurations. Recording media is supported on a surface 13 of media support 12. One or more edge portions of recording media 17 are secured to surface 13 by clamps 28A and 28B. Other example embodiments of the invention can secure recording media 17 to media support 12 by other methods. For example, a surface of recording media 17 can be secured to surface 13 by various methods including providing a low-pressure source between the surfaces.

Apparatus 10 includes imaging head 16, which is movable with respect to media support 17. In this example embodiment of the invention, imaging head 16 is mounted on movable carriage 18. Carriage 18 is moved with respect to support 20 in manner in which imaging head 16 is moved along a path aligned with an axis of the drum of media support 12. In this example embodiment of the invention, imaging head 26 moves along a path aligned with sub-scan axis 24. Media support 12 rotates with respect to support 20. Motion system 22 is used to provide relative motion between imaging head 16 and media support 12. Motion system 22 (which can include one or more motion systems) can include any suitable prime movers needed for the required motion. In this example embodiment of the invention, motion system 22 is used to move media support 12 along a path aligned with main-scan axis 26 while moving imaging head 16 along a path aligned with sub-scan axis 24. Guide system 32 is used to guide carriage 18 which is moved under the influence of transmission member 33. In this example embodiment of the invention, transmission member 33 includes a precision lead screw. Those skilled in the art will realize that other forms of motion can be used in accordance with the present invention. For example, imaging head 16 can be stationary while media support 12 is moved. In other cases, media support 12 is stationary and imaging head 16 is moved. In still other cases, both the imaging head 16 and the media support 12 are moved. One or both of imaging head 16 and media support 12 can reciprocate along corresponding paths. Separate motion systems can also be used to operate different systems within apparatus 10.

Imaging head 16 includes a radiation source (not shown), such as a laser. Imaging head 16 is controllable to direct one or more imaging beams 21 (shown in FIG. 5A) capable of forming image 19A on recording media 17. The imaging beams 21 generated by imaging head 16 are scanned over recording media 17 while image-wise modulated according to image data specifying the image to be written. One or more imaging channels are driven appropriately to produce imaging beams 21 with active intensity levels wherever it is desired to form an image portion. Imaging channels not corresponding to the image portions are driven so as not to image corresponding areas. Image 19A can be formed on recording media 17 by different methods. For example, recording media 17 can include an image modifiable surface, wherein a property or characteristic of the modifiable surface is changed when irradiated by an imaging beam to form an image. An imaging beam can be used to ablate a surface of recording media 17 to form an image. An imaging beam can be used to facilitate a transfer of an image forming material to a surface of recording media 17 to form an image. Imaging head 16 can include a plurality of channels that can be arranged in an array. An array of imaging channels can include a one-dimensional or two-dimensional array of imaging channels. An imaging beam can undergo a direct path from a radiation source to the recording media or can be deflected by one or more optical elements towards the recording media.

Groups of channels can form an image swath having a width related to the distance between a first pixel imaged and a last pixel imaged during a given scan. Recording media 17 is typically too large to be imaged within a single imaged swath. Multiple imaged swaths are typically formed to complete an image on recording media 17.

Controller 30, which can include one or more controllers is used to control one or more systems of apparatus 10 including, but not limited to, various motion systems 22 used by media support 12 and carriage 18. Controller 30 can also control media handling mechanisms that can initiate the loading or unloading of media 17 to and from media support 12 respectively. Controller 30 can also provide image data 37 to imaging head 16 and control imaging head 16 to emit imaging beams 21 in accordance with this data. Various systems can be controlled using various control signals or implementing various methods. Controller 30 is programmable and can be configured to execute suitable software and can include one or more data processors, together with suitable hardware, including by way of non-limiting example: accessible memory, logic circuitry, drivers, amplifiers, A/D and D/A converters, input/output ports and the like. Controller 30 can comprise, without limitation, a microprocessor, a computer-on-a-chip, the CPU of a computer or any other suitable microcontroller. Controller 30 can be associated with a materials handling system, but need not necessarily be, the same controller that controls the operation of the imaging systems.

Figure 2:
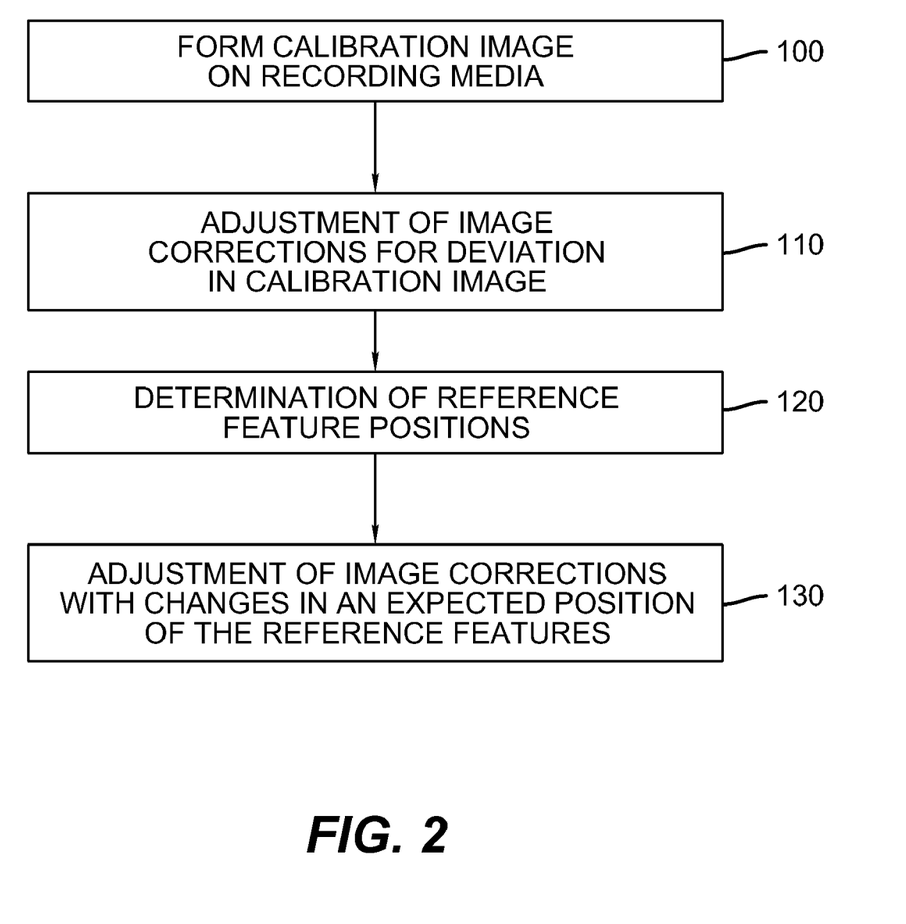
FIG. 2 is a flow chart representing a method as per an example embodiment of the invention.
Figure 3:
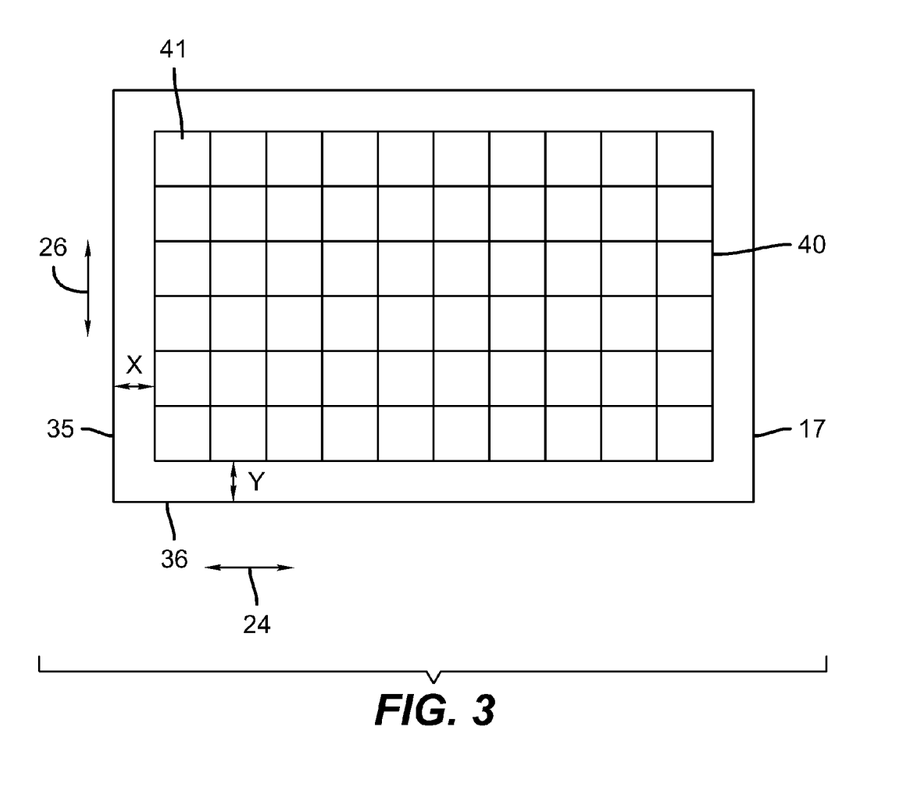
FIG. 3 is a schematic plan view of a target image to be formed on a recording media.

FIG. 2 shows a flow chart representative of a method of calibrating an image recording apparatus as per an example embodiment of the invention. The various steps illustrated in FIG. 2 are described with reference to apparatus 10 shown in FIG. 1. This is for the purposes of illustration only and other suitable imaging apparatus can be used in the present invention. In step 100, apparatus 10 is used to form a target image on recoding media 17. Various target images can be used in step 100. One such image is shown in FIG. 3. In this example, target image 40 comprises a regular grid pattern made up of target cells 41 which are defined by image boundaries of a desired size. In this example embodiment, target cells 41 are square shaped. Target image 40 is represented in a desired alignment with various edges of recording media 17. Specifically, it is desired to form target image 40 by a distance X from edge 35 and by a distance Y from edge 36. It is desired to form target image 40 in an aligned relationship with main-scan axis 26 and sub-scan axis 24.

Target image 40 is represented by image data 37 and is provided to controller 30 to form an image on recoding media 12. Controller 30 controls imaging head 16 to direct imaging beams 21 to form image 19A while scanning over recording media 17. In this example embodiment of the invention, controller 30 controls motion system 22 to cause create relative motion between imaging head 16 and recording media 17 during the imaging. In this example embodiment of the invention, imaging head 16 is translated in a coordinated manner with the rotation of media support 12 to form helically oriented image swaths.

Figure 4:
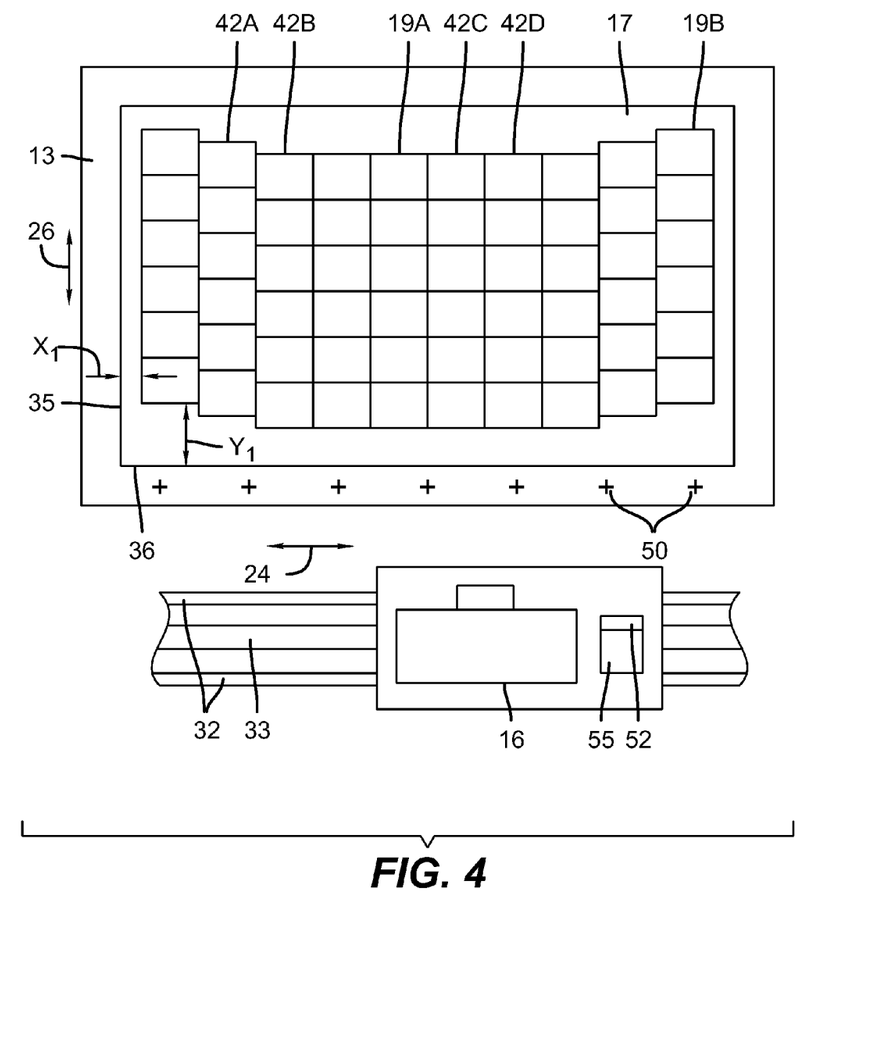
FIG. 4 is a schematic plan view of a the target image of FIG. 3, as formed on a recording media mounted on a media support.

FIG. 4 schematically shows an example calibration image 19B formed on recording media 17 in response to the desired imaging of target image 40 by imaging head 16. Recording media 17 is shown mounted on surface 13 of media support 12. For the sake of clarity recording media 17 and media support surface 13 are depicted in a "flat" orientation. It is to be understood that media support surface is cylindrical in nature in this example embodiment of the invention. As shown in FIG. 4, calibration image 19B does not correspond exactly to target image 40. Various imaging distortions appear in different areas of calibration image 19B. Imaged cells such as imaged cells 42A, 42B, 42C and 42D (collectively referred to as imaged cells) do not correspond exactly to the pattern of target cells 41. For example, imaged cell 42A is shifted in a main-scan direction with respect to imaged cell 42B. FIG. 4 also shows that image cell 42D is elongated in size as compared to image cell 42C. Further, all of the imaged cells 42A-D are elongated in size in a sub-scan direction as compared with target cells 41. FIG. 4 shows that the overall scale of imaged cells 42A-D does not match the required scale of target cells 41. FIG. 4 also shows that calibration image 19B is respectively displaced from edges 35 and 36 by distances $X_1$ and $Y_1$ which differ from desired distances X and Y.

Positional and size distortions can occur for several reasons. For example, overall scaling problems can arise from temperature variances. One, or more of recording media 17, media support 12 and various transmission components such as transmission member 33 can include different material compositions that have different coefficients of thermal expansion. Different expansion rates can lead to scaling problems. Carriage 18 moves along a guide system 32 that is not perfect in form. Guide system 32 can include various suitable guide tracks and guided members that can include sliding or rotational moving bearing elements. Imperfections can be present even when high precision components are used. Mechanical factors such as guided member-to-guide track play; guide track straightness and sag in support 20 can lead to imaging imperfections.

Figure 5A:
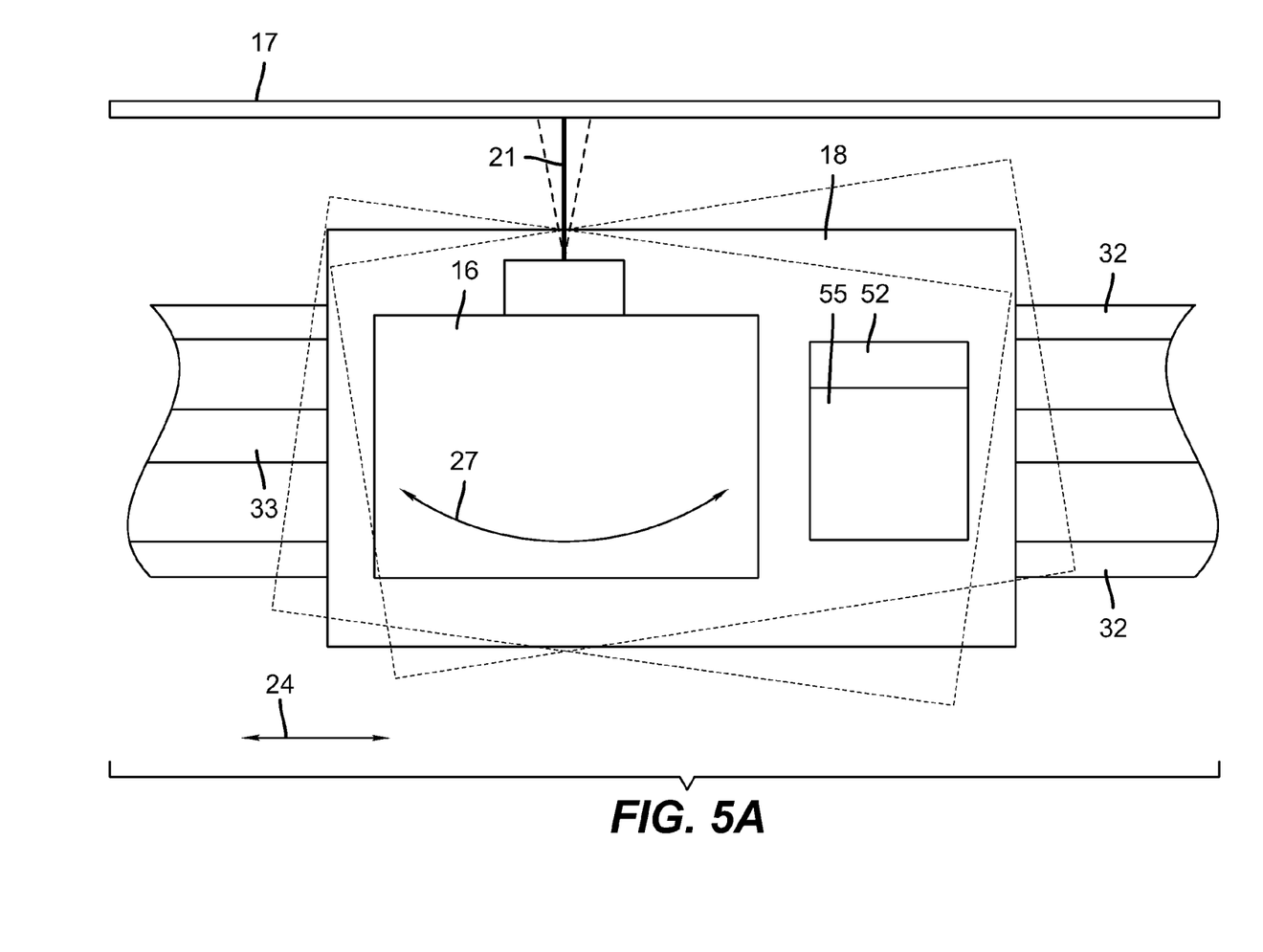
FIG. 5A shows a possible causes for sub-scan deviations of the projection point of imaging beams.

As carriage 18 moves along a path aligned with sub-scan axis 24, mechanical factors can subject imaging head 16 to various additional motions that can adversely impact the projection of imaging beams 21 onto recording media 16. Imaging imperfections can be visualized with reference to FIGS. 5A and 5B. FIG. 5A shows a possible cause for sub-scan deviations in the projection of imaging beams 21 onto recording media 17. In this case, carriage 18 undergoes small yawing rotations (exaggerated for the sake of clarity) along yaw directions 27 as it moved along a path aligned with sub-scan axis 24. This causes variations in the projection of imaging beams 21 onto recording media 17 which can cause distortion of formed images in a sub-scan direction. Yaw motions of carriage 18 can arise for numerous reasons including play in guide system 32. Further, imperfections in other components can lead to sub-scan deviations. For example, transmission member 33 can comprise a precision lead screw, which can have slight pitch irregularities at various points along its length. Pitch irregularities can cause distortion of formed images in a sub-scan direction.

Figure 5B:
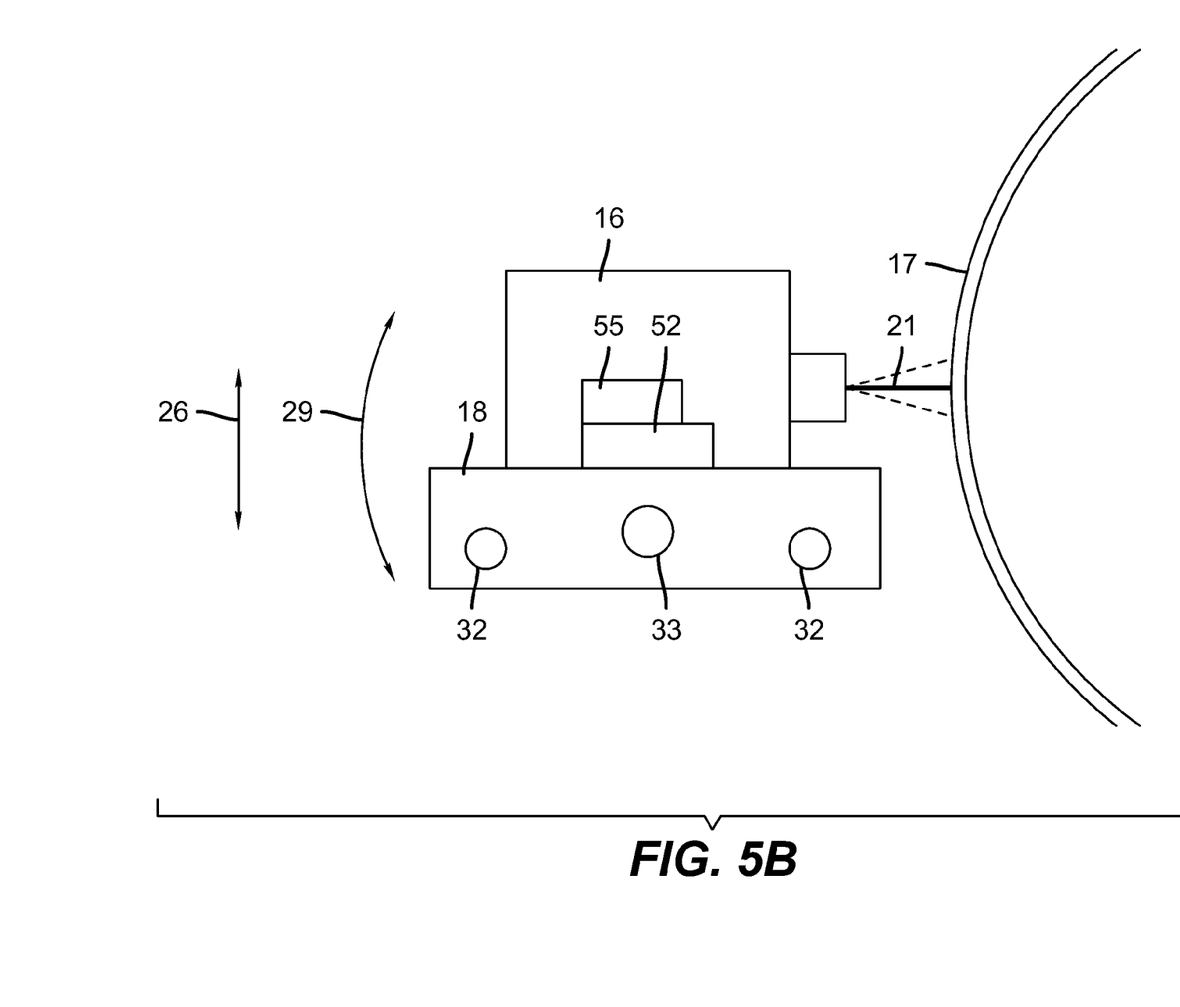
FIG. 5B shows possible causes for main-scan deviations of the projection points of imaging beams.

FIG. 5B shows possible causes for main-scan deviations in the projection of imaging beams 21 onto recording media 17. Main-scan deviations can arise for different reasons. For example, as carriage 18 moves along guide system 32 it may undergo small displacements aligned with main-scan axis 26. The small displacements can be caused by various factors, which can include play in guide system 32, and deviations in the guide tracks including gravitational sag in the tracks and gravitational sag in support 20. Main-scan deviations can be caused as carriage 18 undergoes small pitching rotations, (exaggerated for the sake of clarity) along pitch directions 29 and also as the carriage 18 moves along a path aligned with sub-scan axis 24. Pitch displacements can be caused by numerous reasons including play in guide system 32.

Those skilled in the art will realize that the image distortions described are exemplary in nature and that other types of distortion can occur.

Referring back to FIG. 2, apparatus 10 is adjusted to correct for the deviations in calibration image 19B in step 110. Deviations can be corrected by various methods. In some example embodiments of the invention, main-scan distortions such as the shifts between imaged cells 42A and 42B can be corrected by adjusting an activation timing of the imaging channels. Although the activation of a given imaging channel to form or not form an image pixel is dependent on image data, the timing of the activation of the given channel can be adjusted. Adjustments of the activation timing of various channels can be used to delay or advance the activation of those channels to form or not form one or more image pixels. Various channels can be controlled to offset a first portion of an imaged swath with respect to an additional portion of the imaged swath in a main-scan direction. A portion of a given imaged swath can be offset from a portion of an additional imaged swath. A portion of an imaged swath can include the entirety of the imaged swath. The activation timing of various channels of imaging head 16 can be adjusted at various positions as imaging head 16 is moved along a path aligned with sub-scan axis 24. The distortion of images formed at these various positions can be corrected by activation timing adjustments at these positions. In this example embodiment of the invention, activation-timing changes are made independently of image data 37. Controller 30 can be programmed to provide signals to imaging head 16 to adjust activations timing of its imaging channels. Motion system 22 can include suitable sensors, which can generate various signals representative of a position of imaging head 16 and/or media support 12. In some example embodiments of the invention, sensor signals can be used by controller 30 to adjust activation timings of various channels. Activation timing adjustments can also be made to adjust the position of calibration image 19B from edge 36.

Sub-scan distortions such as elongated imaged cells 42D can be corrected by various methods. In some example embodiments of the invention, the movement of carriage 18 is adjusted. In some example embodiments of the invention, the movement of transmission member 33 is adjusted. Adjusting the movement of carriage 18 or transmission member 33 can include adjusting a speed of carriage 18 or transmission member 33. For example, in a drum based imaging system (e.g. apparatus 10) spiral or helical image swaths are formed as the carriage 18 is translated while media support 12 is rotated. By adjusting the speed of transmission member 33 or carriage 18, the pitch of the helical swaths can be adjusted to scale the image to a desired size. In some example embodiments of the invention, uniform speed adjustments can be used to adjust the overall size of a formed image. In some example embodiments of the invention, non-uniform speed adjustments can be used to adjust the size of a part of the formed image. For example, adjusting a speed of a transmission member 33 at various points along the motion path of carriage 18 can be used to correct image deviations corresponding to those points. Adjusting a speed of a transmission member 33 at various points along the motion path of carriage 18 can be used to correct for pitch discrepancies. Adjusting a speed of transmission member 33 at various points along the motion path of carriage 18 can be used to correct head yaw displacements. Adjustments can also be made to adjust the position of an image in a sub-scan direction. For example, adjustments can be used to adjust a position of calibration image 19B from edge 35.

Controller 30 can be programmed to provide signals to motion system 22 to adjust a movement of carriage 18 or transmission member 33. In some example embodiments of the invention, sensor signals can be used by controller 30 to adjust a movement of carriage 18 or transmission member 33.

Referring back to FIG. 2, the position of reference features 50 is determined in step 120. Reference features 50 are preferably provided on a stable support. In this example embodiment of the invention, reference features 50 are provided on surface 13 of media support 12. Reference features 50 are positioned at various predetermined positions on media support 12. In this example embodiment of the invention, reference features 50 are positioned across surface 13. A plurality of reference features 50 can include a pattern of reference features 50. A pattern of reference features 50 can be a regular or irregular pattern. In this example embodiment of the invention, a sensor 52 detects the position of each reference feature 50. In this example embodiment of the invention, sensor 52 is mounted on carriage 18 in a predetermined alignment with imaging head 16. Sensor 52 detects a position of each reference feature 50 while a position of carriage 18 is determined. For example, referring to FIG. 4, each of the reference features 50 is detected by sensor 52, which is scanned across surface 13 as carriage 18 is moved. Various sensor signals provided by motion system 22 can be used to determine a position of carriage 18 relative to a reference feature 50. Signals can be provided between sensor 52 and controller 30 to detect a position of a reference feature 50. Controller 30, or the like, can determine a position of a reference feature 50 form one or more signals from motion system 22 and sensor 52. In various embodiments of the invention, a position or orientation of a portion of recording media 17 is determined relative to a reference feature. In various example embodiments of the invention, a position of carriage 18 is determined relative to a reference feature.

Each detected reference feature 50 corresponds to a region of surface 13 proximate to a region of recording media 17 in which image corrections in the form of activation timing adjustments and/or movement adjustments were made. Controller 30 is programmed to form correspondences between the image corrections made in the vicinity of a region that includes a detected reference feature 50. Since the position of imaging head 16 is known from the determined position of carriage 18 during the detection of reference features 50, controller 30 is programmed to map desired sets of image corrections to regions associated with each reference feature 50.

Imaging corrections such as activation timing adjustments and/or movement adjustments are typically determined on dedicated equipment at the factory at given point in time. Advantageously, example embodiments of the invention allow future adjustments to image correction parameters at the point of use of the imaging system. The image corrections may need to be adjusted in the future for various reasons. For example, environmental temperature changes can vary from the conditions that the initial calibration was performed in. Various components in motion systems 22 and guide system 32 can wear with use and reduce the precision and accuracy of these systems. Structural elements like support 20 can creep with time due to various loading conditions. Creep in structural elements can be a factor in larger imaging systems. These factors and others can act to alter a desired alignment between the imaging beams 21 emitted by imaging head 16 and the recording media 17, thus reducing the integrity of the formed image.

In accordance with step 130, adjustments are made to the imaging corrections in accordance with a change in the expected position of detected reference features 50. When a subsequent calibration is desired, controller 30 operates motion system 22 and sensor 52 to detect the positions of each feature 50. Controller 30 or the like is used to determine the position of each of the detected reference feature 50. Controller 30 compares the newly determined positions of reference features 50 against the previously determined positions. If during this comparison, a change in an expected position of a detected reference feature 50 is noted, then controller 30 adjusts the imaging corrections in accordance with this change. Changes in the expected position of a given detected reference feature 50 is indicative of some change in the alignment of the imaging beams 21 and recording media 17 in a region in the vicinity of the given reference feature 50.

In some example embodiments of the invention, adjustments are made in accordance with a magnitude of the change in determined positions. In some example embodiments of the invention, adjustments are made in accordance with a direction of the change in determined positions. In some example embodiments of the invention, adjustments are made in accordance with a magnitude and direction of the change in determined positions. For example, if a change is determined in the position of a given reference feature 50 along a direction aligned with main-scan axis 26, controller 30 determines the change and adjusts the imaging corrections of regions in proximity to the given reference feature 50. Adjustments can be made by adjusting the activation timing of various imaging channels when imaging head 16 is positioned to image portions of an image in the regions in proximity to the given reference feature 50.

If a change is determined in the position of a given reference feature 50 along a direction aligned with sub-scan axis 24, controller 30 determines the change and adjusts the imaging corrections of regions in the vicinity of the given reference feature 50. Adjustments can be made by adjusting a movement of carriage 18 or transmission member 33 when imaging head is positioned to image portions of an image in the regions in proximity to the given reference feature 50. Adjustments can be made by adjusting a speed of carriage 18 or motion system 22 when imaging head 16 is positioned to image portions of an image in the regions in the vicinity of the given reference feature 50. Controller can make adjustments to the imaging corrections locally with respect to a given reference feature 50 or globally across a plurality of reference features 50. For example, global corrections can be made in accordance with a temperature change that would result in an overall scaling error in a formed image. Local corrections can be made by adjusting the movement of carriage 18 or motion system 22 to adjust for localized effects such as changes in carriage yaw.

In some example embodiments of the invention, adjustments made to imaging corrections in accordance with a change along a first direction of an expected position of a given reference feature 50 can alter the adjustments required by a change along a second direction of the expected position. In some example embodiments of the invention, adjustments made to imaging corrections in accordance with a change in the expected position of a first reference feature 50 can alter the adjustment of the imaging corrections associated with a second reference feature 50.

Advantageously, the recalibration of apparatus 10 can be performed at the point of use. Recalibration can be performed without the need to form additional calibration images. Recalibration can be performed without the need of additional calibration equipment. In some example embodiments of the invention, controller 30 maintains data representative of the various adjustments made to the imaging corrections to establish a log. Such logs can be used to identify conditions that can improve the image quality of the system.

In various embodiments of the invention, sensor 52 can include any suitable sensor for detecting a reference feature 50. Without limitation, such sensors can include optical, mechanical and electrical elements. In some example embodiments of the invention, sensor 52 can include an image capture device. In some example embodiments of the invention, sensor 52 can include a CCD sensor or a CMOS sensor. CCD cameras can be employed to capture images of registration features 50. CCD cameras employing appropriately sized fields of view can be used to capture a registration feature 50 in its entirety. CCD cameras employing appropriately sized fields of view can be used to provide signals corresponding to a position of a reference feature 50. CCD camera signals can be used to define a main-scan position of a detected reference feature 50. Alternatively or additionally, signals (e.g. encoder signals) corresponding to a movement of media support 12 can be used to define a main-scan position of a given reference feature as it is positioned in the field of view of the CCD camera. CCD camera signals can be used to define a sub-scan position of a detected reference feature 50.

In some example embodiments of the invention, illuminator 55 is used to illuminate a reference feature 50 while it is detected. Illuminator 55 can be used to illuminate a reference feature 50 while an image of the feature is captured. In some example embodiments of the invention, a reference feature 50 can emit one or more radiation beams suitable for detection by sensor 52. In some example embodiments of the invention, illuminator 55 includes a source of radiation that can emit radiation towards surface 13. A reference feature 50 can be constructed from materials that differ from those of surface 13 such that the radiation interacts differently with the registration feature 50 than surface 13. Alternatively or additionally, reference feature 50 can include a form or shape that causes the radiation to interact differently with registration feature 50 than surface 13. Differences in interaction of the radiation between the registration feature 50 and surface 13 can include differences in the amount of the radiation that is reflected or the direction in which the radiation is reflected. A reference feature 50 can protrude from, or be recessed from surface 13. Changes in the amount or direction of reflected light can be detected by sensor 52 to detect the position of a reference feature 50. In some example embodiments of the invention, illuminator 55 includes an emitter of a emitter/receiver type sensor. In some example embodiments of the invention, illuminator 55 is part of a range finding mechanism used to accurately determine a distance between imaging head 16 and recording media 17. Range finding mechanisms can be used as part of an auto-focus system used to maintain a required focus during imaging. In some example embodiments of the invention, illuminator 55 includes an LED light source. In some example embodiments of the invention, illuminator 55 includes a strobe light source.

In some example embodiments of the invention, one or more imaging beams 21 emitted by imaging head 16 are used to detect a reference feature 50. The one or more imaging beams 21 can be used to detect a position of a reference feature 50 in manners similar to those described in other example embodiments of the invention. Using imaging beams 21 to detect reference features 50 can provide a more direct correspondence between the position of imaging head 16 during the detection of a given reference feature 50 and the position of the imaging head 16 during the imaging of a region of the recording media in the vicinity of the given reference feature 50.

Reference features 50 can include various shapes and forms suitable for detection by sensor 52. Without limitation, reference features 50 can include various registration marks or fiducial marks. Reference features 50 can include crosshairs, diamond shapes, circular shapes and the like.

It is to be understood that the exemplary embodiments of the invention are merely illustrative and that those can devise many variations of the described embodiments skilled in the art without departing from the scope of the invention.

PARTS LIST 10 apparatus
12 media support
13 surface
16 imaging head
17 recording media
18 carriage
19A image
19B calibration image
20 support
21 imaging beams
22 motion system
24 sub-scan axis
26 main-scan axis
27 yaw directions
28A clamps
28B clamps
29 pitch directions
30 controller
32 guide system
33 transmission member
35 edge
36 edge
37 image data
40 target image
41 target cells
42A imaged cells
42B imaged cells
42C imaged cells
42D imaged cells
50 reference features
52 sensor
55 illuminator
100 step
110 step
120 step
130 step
X distance
$X_1$ distance
Y distance
$Y_1$ distance

The invention claimed is:

1. A method for changing the calibration of an imaging system to adjust for geometric distortion, comprising:
   providing a media support for receiving recording media and a plurality of individually spaced reference features disposed on a surface of the media support;
   providing a plurality of individually addressable imaging channels moveable relative to the imaging support while directing imaging beams from the addressable channels to form images on the recording media;
   determining a change in an expected position of at least one reference feature and adjusting activation timing of a portion of the imaging channels in accordance with such changes;
   further including providing the imaging channels on a moveable carriage and further including adjusting movement of the carriage in accordance with such changes; and
   wherein adjusting the movement of the carriage comprises adjusting speed of the carriage.

2. Apparatus for adjusting the calibration of an imaging system to correct for geometric distortion, comprising:
   a support;
   a drum for receiving recording media, the drum rotatably mounted on the support and including a plurality of individually spaced reference features;
   a carriage mounted on the support and operable for moving a plurality of individually addressable imaging channels along a path relative to an axis of the drum while directing imaging beams to form an image on the recording media;
   a sensor for detecting a position of at least one reference feature; and a controller programmed for determining a change in an expected position of the detected at least one reference feature and adjusting the speed of the carriage in accordance with such changes.

3. Apparatus according to claim 2, wherein the controller is programmed to adjust activation timing of a portion of the imaging channels.

4. Apparatus according to claim 2, wherein the controller is programmed to adjust activation timing of the portion of the imaging channels in accordance with such changes.

5. Apparatus according to claim 2, wherein the controller is programmed to the speed of the carriage when the carriage is proximate to the at least one reference feature.

6. Apparatus according to claim 2, wherein the controller is programmed to the speed of the carriage at a first point along the path, the speed of the carriage at the first point being different than the speed of the carriage at an additional point along the path.

7. Apparatus according to claim 6, wherein the first point is proximate to the at least one registration feature.

8. Apparatus according to claim 2, wherein the controller is programmed to globally vary the speed of the carriage.

9. Apparatus according to claim 2, including a transmission member for moving the carriage along the path, wherein the controller is operable for adjusting the speed of the transmission member in accordance with such changes.

10. Apparatus according to claim 2, wherein the carriage is operable for moving the sensor along the path.

11. Apparatus according to claim 2, wherein the sensor includes a CCD sensor.

12. Apparatus according to claim 2, wherein the sensor includes a CMOS sensor.

* * * * *